(12) United States Patent
Rao

(10) Patent No.: US 7,551,912 B2
(45) Date of Patent: Jun. 23, 2009

(54) DEVICE MANAGEMENT NETWORK THAT FACILITATES SELECTIVE BILLING

(75) Inventor: Bindu R. Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 942 days.

(21) Appl. No.: 11/057,361

(22) Filed: Feb. 14, 2005

(65) Prior Publication Data

US 2005/0182697 A1 Aug. 18, 2005

Related U.S. Application Data

(60) Provisional application No. 60/544,398, filed on Feb. 12, 2004.

(51) Int. Cl.
  *H04M 11/00* (2006.01)
(52) U.S. Cl. .............. 455/406; 379/114.05; 379/127.03
(58) Field of Classification Search ................. 379/111, 379/112.01, 112.07, 114.01, 114.03, 114.05, 379/114.22, 121.05, 122, 126, 127.01, 127.03; 455/405–408
  See application file for complete search history.

(56) References Cited

U.S. PATENT DOCUMENTS

| | | | |
|---|---|---|---|
| 5,261,055 A | 11/1993 | Moran et al. | |
| 5,442,771 A | 8/1995 | Filepp et al. | |
| 5,479,637 A | 12/1995 | Lisimaque et al. | |
| 5,579,522 A | 11/1996 | Christeson et al. | |
| 5,596,738 A | 1/1997 | Pope | |
| 5,598,534 A | 1/1997 | Haas | |
| 5,608,910 A | 3/1997 | Shimakura | |
| 5,623,604 A | 4/1997 | Russell et al. | |
| 5,666,293 A | 9/1997 | Metz et al. | |
| 5,752,039 A | 5/1998 | Tanimura | |
| 5,778,440 A | 7/1998 | Yiu et al. | |
| 5,790,974 A | 8/1998 | Tognazzini | |
| 5,878,256 A | 3/1999 | Bealkowski et al. | |
| 5,943,406 A * | 8/1999 | Leta et al. ................... | 379/120 |
| 5,960,445 A | 9/1999 | Tamori et al. | |

(Continued)

FOREIGN PATENT DOCUMENTS

CA 2339923 3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Binh K Tieu

(57) ABSTRACT

Aspects of the present invention may be seen in a device management (DM) network capable of associating billing codes with device management activities that involve transfer of data, upload or download of content, device management activities, reporting diagnostics messages, reporting alerts, reporting events, etc., in order to facilitate selective billing of such activities and selective assignment of one of several possible billing entities with these activities. In one embodiment of the present invention, each DM session has an associated billing code. In another embodiment of the present invention, nodes in a DM tree in the device may have an associated billing code to be communicated or otherwise used for billing by a billing server.

20 Claims, 4 Drawing Sheets

U.S. PATENT DOCUMENTS

| | | | |
|---|---|---|---|
| 6,009,497 | A | 12/1999 | Wells et al. |
| 6,038,636 | A | 3/2000 | Brown, III et al. |
| 6,064,814 | A | 5/2000 | Capriles et al. |
| 6,073,206 | A | 6/2000 | Piwonka et al. |
| 6,073,214 | A | 6/2000 | Fawcett |
| 6,088,759 | A | 7/2000 | Hasbun et al. |
| 6,105,063 | A | 8/2000 | Hayes, Jr. |
| 6,112,024 | A | 8/2000 | Almond et al. |
| 6,112,197 | A | 8/2000 | Chatterjee et al. |
| 6,126,327 | A | 10/2000 | Bi et al. |
| 6,128,695 | A | 10/2000 | Estakhri et al. |
| 6,157,559 | A | 12/2000 | Yoo |
| 6,163,274 | A | 12/2000 | Lindgren |
| 6,198,946 | B1 | 3/2001 | Shin et al. |
| 6,279,153 | B1 | 8/2001 | Bi et al. |
| 6,311,322 | B1 | 10/2001 | Ikeda et al. |
| 6,438,585 | B2 | 8/2002 | Mousseau et al. |
| 2001/0029178 | A1 | 10/2001 | Criss et al. |
| 2001/0047363 | A1 | 11/2001 | Peng |
| 2001/0048728 | A1 | 12/2001 | Peng |
| 2002/0078209 | A1 | 6/2002 | Peng |
| 2002/0116261 | A1 | 8/2002 | Moskowitz et al. |
| 2002/0131404 | A1 | 9/2002 | Mehta et al. |
| 2002/0152005 | A1 | 10/2002 | Bagnordi |
| 2002/0156863 | A1 | 10/2002 | Peng |
| 2002/0157090 | A1 | 10/2002 | Anton, Jr. |
| 2003/0033599 | A1 | 2/2003 | Rajaram et al. |
| 2003/0037075 | A1 | 2/2003 | Hannigan et al. |
| 2003/0061384 | A1 | 3/2003 | Nakatani |
| 2003/0185363 | A1* | 10/2003 | Cerami et al. ............... 379/126 |
| 2004/0170261 | A1* | 9/2004 | Baker .................... 379/114.01 |
| 2005/0182697 | A1* | 8/2005 | Rao ........................... 705/28 |
| 2006/0059021 | A1* | 3/2006 | Yulman et al. ................. 705/4 |
| 2006/0230394 | A1* | 10/2006 | Forth et al. ................. 717/168 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

DEVICE MANAGEMENT NETWORK THAT FACILITATES SELECTIVE BILLING

RELATED APPLICATIONS

This patent application makes reference to, claims priority to and claims benefit from U.S. Provisional Patent Application Ser. No. 60/544,398, entitled "Device Management Network that Facilitates Selective Billing," filed Feb. 12, 2004.

The complete subject matter of the above-referenced United States Provisional Patent Application is hereby incorporated herein by reference, in its entirety. In addition, this application makes reference to U.S. Provisional Patent Application Ser. No. 60/537,374, entitled "Network with Broker for Device Management," filed Jan. 16, 2004, U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. This firmware and application software often contain software bugs. New versions of the firmware and software are periodically released to fix the bugs or to introduce new features, or both. Often, a device management (DM) server facilitates bug-fixing operations. Frequently, it is unclear who should pay for the ensuing data traffic. It is also usually not clear how a carrier network can support different billing models when it comes to data traffic due to device management activities.

Problems often arise while conducting updates of firmware/software in such electronic devices, problems such as, for example, managing the millions of devices that require firmware upgrades and provisioning of applications. Sometimes there can be problems in providing flexible billing services for the electronic devices. Mainly, there are problems associated with determining how and which of the various DM activities should be charged.

Typically, several carrier networks, each with its own billing server have to be modified to work with third party entities that will be billed for services rendered to mobile subscribers. Often, it is not clear how these billing servers need to be modified to accommodate the differences.

Further limitations and disadvantages of conventional and traditional approaches will become apparent to one of ordinary skill in the art through comparison of such systems with the present invention.

BRIEF SUMMARY OF THE INVENTION

A system and/or method for facilitating device management activities in electronic devices in a carrier network, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to updating of firmware/software in an electronic device such as, for example, a mobile handset in a carrier network using a device management solution. More specifically, the present invention relates to selective billing for services and data transfer in a carrier network, and to the incorporation of a billing code in device management activities in a device management network such as, for example, a wireless network. Although the following discusses various aspects of the invention in terms of a mobile handset or device, it should be clear that the following also applies to other mobile electronic devices such as, for example, personal digital assistants (PDAs), pagers, personal computers (PCs), and similar handheld electronic devices.

Figure 1:
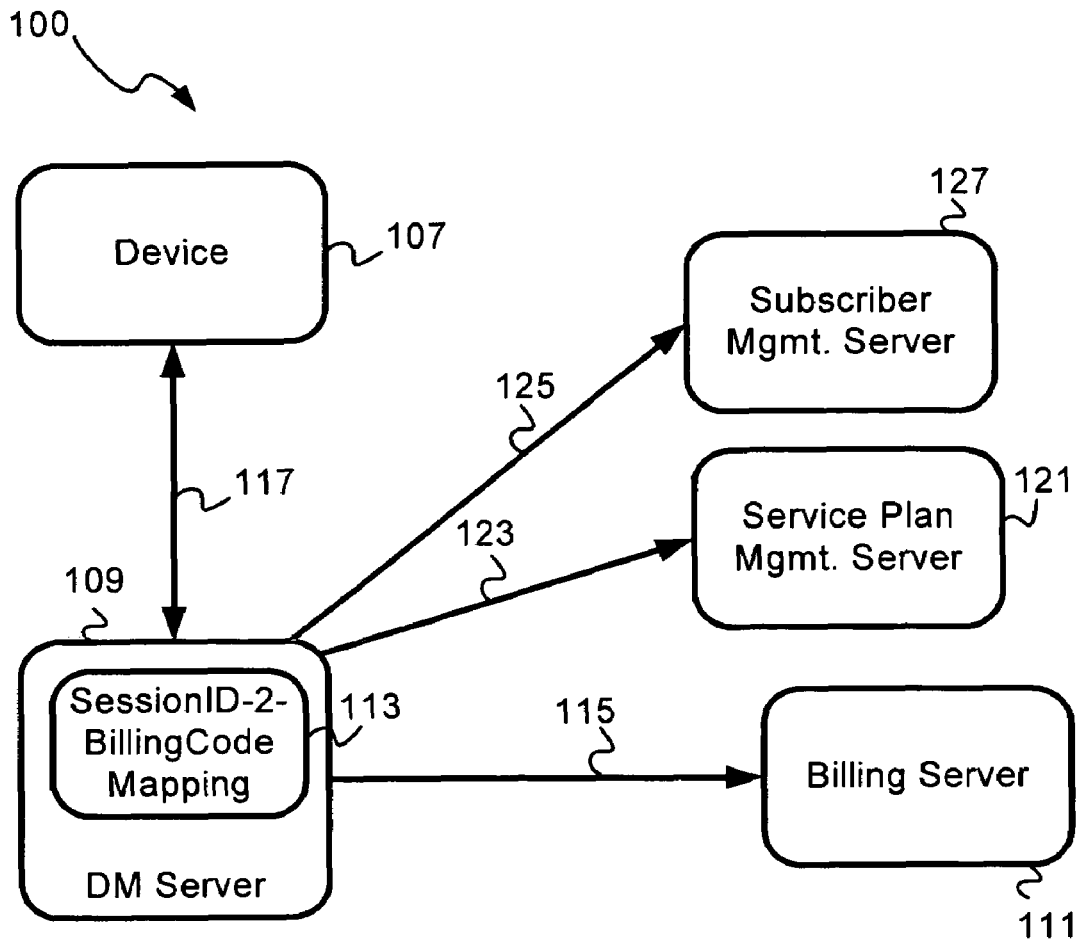
FIG. 1 illustrates a block diagram of an exemplary device management (DM) network, in accordance with an embodiment of the present invention.

FIG. 1 illustrates a block diagram of an exemplary device management (DM) network 100, in accordance with an embodiment of the present invention. The DM network 100 may be, for example, a mobile handset network that employs a device management (DM) server 109 to disseminate content to a device 107 such as, for example, a mobile handset via a communication network 117. The content may be, for example, update packages. In an embodiment of the present invention, an update package may comprise executable instructions used to convert firmware/software in the device 107 from one version to another. The DM network 100 may also employ the DM server 109 to manage the resources in the device 107 and the services accessed from the device 107. The communication network 117 may comprise, for example, a cellular or personal communication service (PCS) network, a paging network, a personal area or local area network, a wired network, and the Internet.

In an embodiment of the present invention, the DM network 100 may comprise the DM server 109, the device 107, a billing server 111, a service plan management server 121, and a subscriber management server 127. The DM server 109 may, for example, employ a session-id for each interaction with the device 107, wherein each session may comprise at least one SyncML-based package and results communicated back and forth between the DM server 109 and the device 107. The SyncML protocols are developed with the oversight of the Open Mobile Alliance (OMA). Each SyncML package may, for example, comprise at least one SyncML message, which may comprise at least one command, alert, etc. The DM server 109 may generate session-IDs and employ them for session-based interactions with the device 107. The DM server 109 may also retrieve billing codes, as appropriate, and associate them with the session-IDs. The billing codes may be provided by, for example, the billing server 111, the service plan management server 121, or the subscriber management server 127.

In an embodiment of the present invention, the DM server 109 may maintain a mapping 113 between session-ids and billing codes associated with each management activity initiated by the DM server 109. When a DM session is completed or terminated, the DM server 109 may employ the associated billing code to create a billing message that is communicated to the billing server 111. In an embodiment of the present invention, the billing message may comprise, for example, subscriber details, service details, and the billing code associated with the session. The subscriber details may be retrieved from the subscriber management server 127 that may contain, for example, information on the subscriber's account, the service plan subscribed to by the subscriber, information on various services that the subscriber has obtained access to, etc. The service plan management server 121 may provide detailed information on the services associated with a subscriber's service plan. For example, a subscriber with a "premier" or "corporate" service plan may have a subscription to a different/enhanced set of services than another subscriber with subscription to a "basic" service plan.

In an embodiment of the present invention, the DM server 109 may maintain a session ID-to-billing code mapping 113 associated with each management activity initiated by the DM server 109. The billing code may be provided by another server in the DM network 100 or from a server external to the DM network 100 such as, for example, a server-of a third party service provider (not shown). The billing code associated with each DM session may facilitate determination of which entity gets billed for some or all of the data traffic associated. Valid entities may comprise, for example, the subscriber, the network operator, the manufacturer of the device 107, and third parties (e.g., external to the DM network 100) that provide a service to the device 107 or to the subscriber using the device 107. In another embodiment of the present invention, more than one billing code may be specified for the DM activities conducted within a given DM session, i.e., some DM activities in a DM session may be billed to one entity, while other DM activities in the same session may be billed to another entity. In an embodiment of the present invention, the DM activities may comprise, for example, a provisioning event, a firmware update event, a software update event, a diagnostic event, a software purchase event, an installation event, a download event, or a software deletion event.

In an embodiment of the present invention, asynchronous events such as, for example, simple network management protocol (SNMP) traps, diagnostic messages, performance related messages, client generated events, alerts, etc. that may be received by the DM server 109 may be associated with an appropriate billing code by the DM server 109. The DM server 109 may also communicate a billing record comprising, for example, subscriber details, service details, and the billing code, to the billing server after handling the asynchronous events such as, for example, SNMP traps, client generated events, alerts, etc.

In an embodiment of the present invention, the DM server 109 may maintain a session ID-to-billing code mapping 113, for example, in a database or table, so as to facilitate billing of DM activities such as those activities that may be initiated by the DM server 109.

In an embodiment of the present invention, the DM network 100 may be capable of associating billing codes with activities that involve, for example, transfer of data, upload or download of content, device management activities, reporting diagnostics messages, reporting alerts, reporting events, etc., in order to facilitate selective billing of such activities and selective assignment of one of several possible billing entities with these activities. In one embodiment of the present invention, each DM session may have an associated billing code. In another embodiment of the present invention, nodes in a management tree (i.e., DM tree) in the device 107 may have an associated billing code to be communicated or otherwise used for billing by the billing server 111.

In an embodiment of the present invention, the DM server 109 may create a charging detail record (CDR), which may comprise, for example, a collection of sufficient information to enable charging and tracking. A CDR may comprise information such as, for example: an IMEI (International Mobile Equipment Identifier) for identifying the device 107; a client ID for identifying the client/subscriber of services; a NW-ID (network ID) for identifying the network and/or the operator of the network such as, for example, the DM network 100. The CDR may also comprise, for example, a session ID for identifying the device management (DM) session; a timestamp that may be based on UTC; a type of action for identifying the management action (e.g., software installation, etc.); an initiator for initiating the management action, which may comprise a reference to an external entity or management authority; a success/failure indicator for indicating whether success or failure occurred during the management operation; and application specific parameters for specifying a set of appropriate application-specific parameters. In an embodiment of the present invention, the session ID may be a unique identifier to ensure accurate recording/charging.

In an embodiment of the present invention, the DM server 109 may receive a notification from the device 107 regarding device management events that terminated, and an indication of whether the events terminated successfully or unsuccessfully. The DM server 109 may then create and store a CDR, and may provide access to the CDR from remote systems via an interface such as, for example, a web services interface such as, for example, the interface provided by the simple object access protocol (SOAP). An external third party may retrieve the CDR to use device-specific information, the session ID, an associated task ID, or a job ID.

Figure 2:
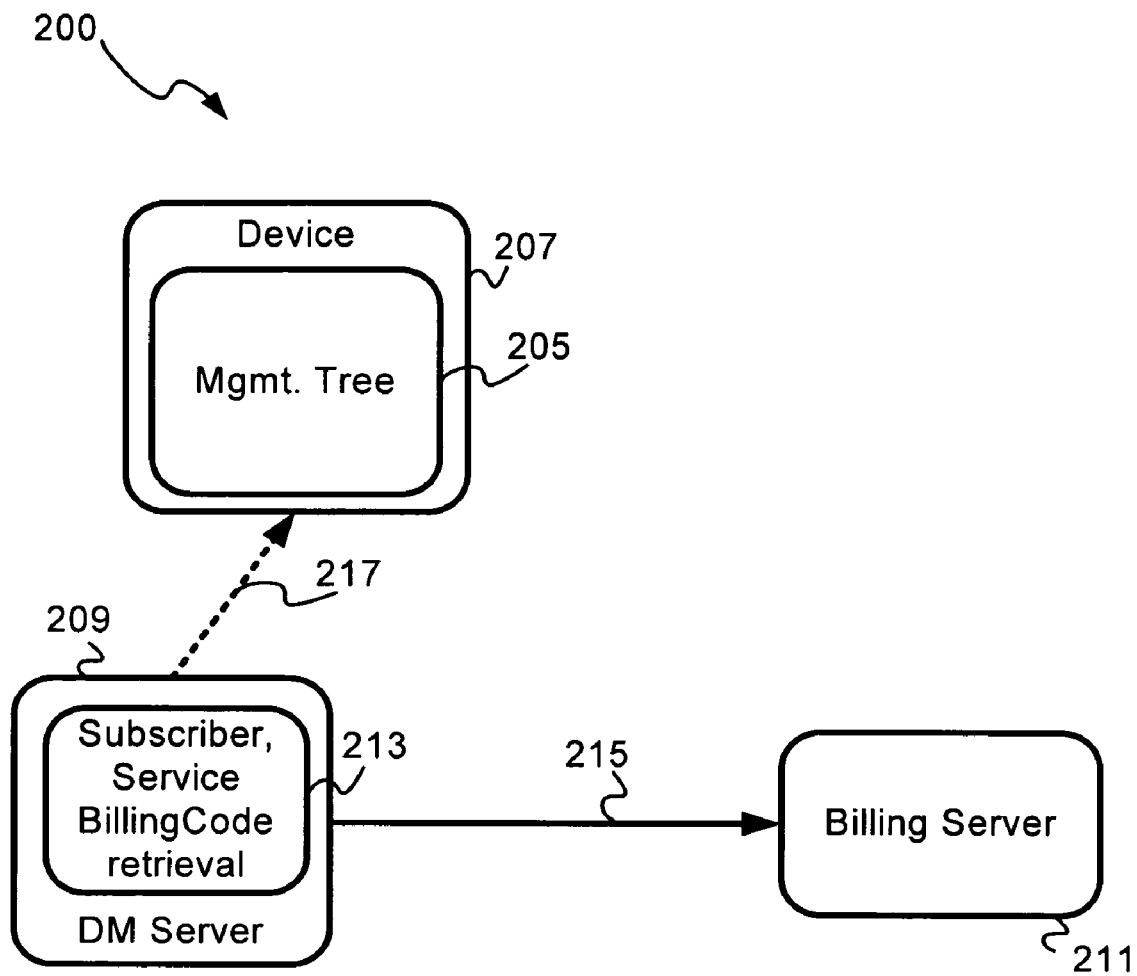
FIG. 2 illustrates a block diagram of an exemplary DM network, in accordance with an embodiment of the present invention.

FIG. 2 illustrates a block diagram of an exemplary DM network 200, in accordance with an embodiment of the present invention. The DM network 200 may comprise a device 207, a DM server 209, and a billing server 211. The device 207 may comprise a management tree 205 that may provide the association of billing codes for services and events managed via the management tree 205. The DM server 209 may be capable of managing the device 207 and the billing server 211, via the communication networks 217 and 215, respectively. The communication networks 215, 217 may correspond to, for example, the communication networks 117, 115 of FIG. 1. The billing server 211 may receive from the DM server 209 a billing record containing subscriber details, service details, and one or more billing codes. The device 207 may maintain the management tree 205, which may be utilized as a means for the DM server 209 to manage resources and services in the device 207. The DM server 209 may, for example, be capable of adding elements (e.g., nodes, leaves, etc.), replacing elements, deleting elements, executing elements, etc. in the management tree 205. Additionally, the DM server 209 may be capable of adding to the management tree 205, elements that represent billing codes for services, billing codes for events, billing codes for diagnostic messages, billing codes for firmware updates, billing codes for download of software, billing codes for third party services, etc.

The DM server 209 may receive event information, diagnostic information, data retrieved from the management tree 205, etc. along with associated billing codes that may have been previously set by the DM server 209, by other DM servers (representing secondary or alternative management authorities, not shown), or by the manufacturer of the device 207 during a factory installation of the management tree 205. When the DM server 209 receives the events, data, etc. from the device 207 with an associated billing code, it may report to the billing server 211, for example, subscriber details (or subscription details), service details that may apply, and an associated billing code that may be retrieved from the management tree 205 in the device 207.

In an embodiment of the present invention, the DM server 209 may, for example, set billing codes in the management tree 205 whenever it provisions a new service for the device 207, or whenever it enables diagnostics reporting, firmware updates, asynchronous events, etc.

Table 1 below illustrates an exemplary measured rate plan for a service that an operator may sell to its corporate (i.e., business) subscribers, or to its residential subscribers. The measured rate plan may provide for a limited number of units of service for a given monthly rate. A billing code may also be associated with the service. Together with the billing code and the measured rate plan, a billing report may be generated by a DM server such as, for example, the DM server 109 of FIG. 1 or the DM server 209 of FIG. 2, or some management server in an operators network.

The billing code may indicate who is to be charged (or which account is to be charged) for all the data and information flow when a service is provisioned, accessed or managed. In an embodiment of the present invention, one or more of the following entities, for example, may be charged for flow of signal, data, management messages, information, etc.: the operator of a DM network, the manufacturer of a device, the subscriber, or a third party associated with a service.

TABLE 1

| | Non-Recurring Service Install Charge | Monthly Recurring Charge | Charge per Unit |
|---|---|---|---|
| Business Measured Rate Plan | | | |
| Billing Code: AAAAA | | | |
| Month-to-Month | $200.00 | $64.68 | $0.025 per unit |
| 12-Month Term | $100.00 | $64.68 | $0.02 per unit |
| 36-Month Term | Free Install | $64.68 | $0.015 per unit |

TABLE 1-continued

| | Non-Recurring Service Install Charge | Monthly Recurring Charge | Charge per Unit |
|---|---|---|---|
| Subscriber Measured Rate Plan | | | |
| Billing Code: BBBB | | | |
| Month-to-Month | $200.00 | $44.09 | $0.025 per unit |
| 12-Month Term | $100.00 | $44.09 | $0.02 per unit |
| 36-Month Term | Free Install | $44.09 | $0.015 per unit |

Figure 3:
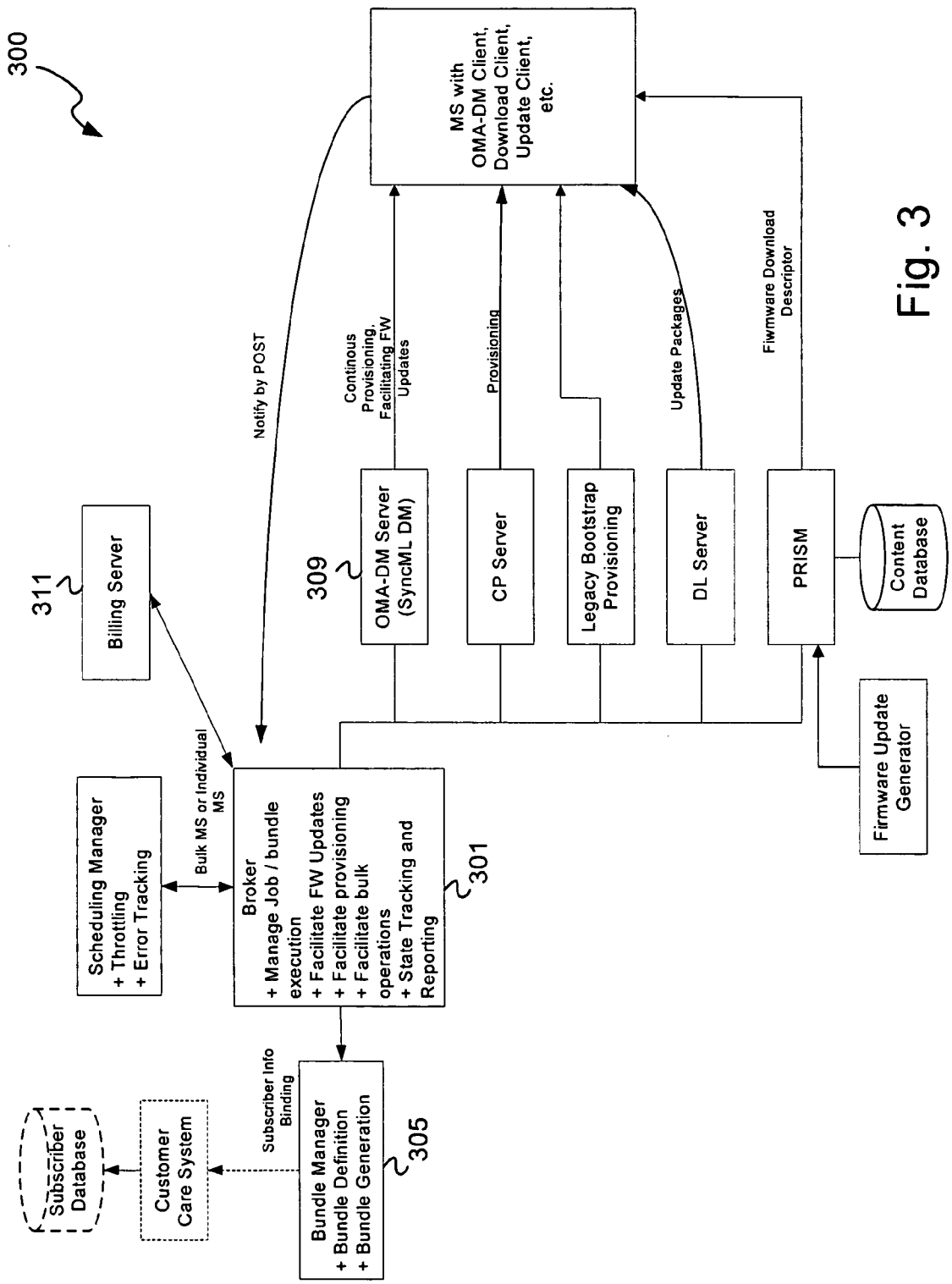
FIG. 3 illustrates a block diagram of an exemplary mobile handset network, in accordance with an embodiment of the present invention.

FIG. 3 illustrates a block diagram of an exemplary mobile handset network 300, in accordance with an embodiment of the present invention. The mobile handset network 300 may employ a broker 301 and a DM server 309, wherein the broker 301 may enable the execution of bundles of device management (DM) activities including, for example, the update of provisioning information, firmware, and content in order to manage mobile devices in the mobile handset network 300. A description of the processing of bundles of device management activities may be found in U.S. Provisional Patent Application Ser. No. 60/537,374, entitled "Network with Broker for Device Management," filed Jan. 16, 2004, the complete subject matter of which is hereby incorporated herein by reference, in its entirety. A billing server 311 may be used to facilitate billing for DM activities based on billing codes provided for those DM activities by the broker 301. The broker 301 may facilitate execution of bundles of DM activities via the DM server 309 and other servers, wherein each bundle may comprise firmware update specifications, provisioning needs, tracking and reporting operations, etc., each of these activities being associated by the broker 301 with one or more billing codes. The broker 301 may also maintain a range of billing codes and assign them to specific DM activities. The billing server 311 may determine which billing entity is to be billed for services, data transfers, general traffic, signaling traffic etc. based on the billing codes received in billing reports from the broker 301 or from the DM server 309.

In an embodiment of the present invention, a billing code may be set for each bundle of DM activities that the broker 301 executes with the help of the DM server 309. The bundle of DM activities may comprise one or more DM activities such as, for example, a firmware update, a wallpaper download, a provisioning event, parameter changes, setting up of email accounts, etc. In one embodiment of the present invention, the billing code associated with a bundle definition may be dynamically generated and made accessible and/or verifiable by the billing server 311. A bundle manager 305 may facilitate the creation of bundles of DM activities and the broker 301 and/or the bundle manager 305 may create a billing code and associate it with the bundle. In one embodiment of the present invention, more than one billing code may be associated with a bundle. In another embodiment of the present invention, each DM activity listed in a bundle may be assigned a separate billing code.

In an embodiment of the present invention, a billing code may be assigned by an entity of the mobile handset network 300 such as, for example, the bundle manager 305 or the broker 301 and the actual billing may depend on the various components of a bundle. Some components of the bundle may be charged to one billing entity such as, for example, an operator, while others may be charged to a different billing entity such as, for example, a third party providing ring-tones, etc. The DM server 309 may associate a session ID with the billing code for the various (e.g., one or more) DM sessions it may employ for executing the DM activities of a bundle. The DM server 309 may also determine whether any of the sessions were unsuccessfully terminated and ensure that the associated billing entity is not charged for it. In addition, if any DM activity such as, for example, the download of firmware or a ring-tone is repeatedly attempted until it succeeds, the broker 301 or DM server 309 may be capable of ensuring that the associated billing entity is not charged multiple times for the same content download or the repeat of the same DM activity.

Table 2 below illustrates exemplary billing code ranges assigned by an operator for various types of traffic such as, for example, for specific DM activities. The table provides for the specification of billing code range for DM activities that may be charged to an operator, to a manufacturer, to a third party, or to a subscriber. For example, the billing code range of AAAAA-BBBBB is assigned in Table 2 to activities that are to be charged to an operator.

In one embodiment of the present invention, the billing code ranges may provide for a contiguous set of numbers wherein the range may, for example, comprise a five digit code starting with a billing code number (or generally for a fixed set of digits) and a five digit code ending with a billing code number. In another embodiment of the present invention, the billing codes may be made up of a combination of other codes such as, for example, a service code, an event code, a DM activity code, etc.

In an embodiment of the present invention, the billing code may incorporate a carrier code or operator code, activity code, etc. In another embodiment of the present invention, the billing code may incorporate a subscriber's code or a device code such as, for example, an IMSI (international mobile station identifier), an ESN (electronic serial number), an IMEI (international mobile equipment identifier), a MSISDN (mobile station ISDN number), etc.

TABLE 2

Billing Code Range
Each of the billing codes in a given range may be assigned to a specific service, event, or data. The codes AAAAA, etc. represent exemplary 5-digit codes

|       | Charged to Operator | Charged to Manufacturer | Charged to Third Party | Charged to Subscriber |
|-------|---------------------|-------------------------|------------------------|-----------------------|
| Range | AAAAA-BBBBB         | CCCCC-DDDDD             | EEEEE-FFFFF            | GGGGG-HHHHH           |

Figure 4:
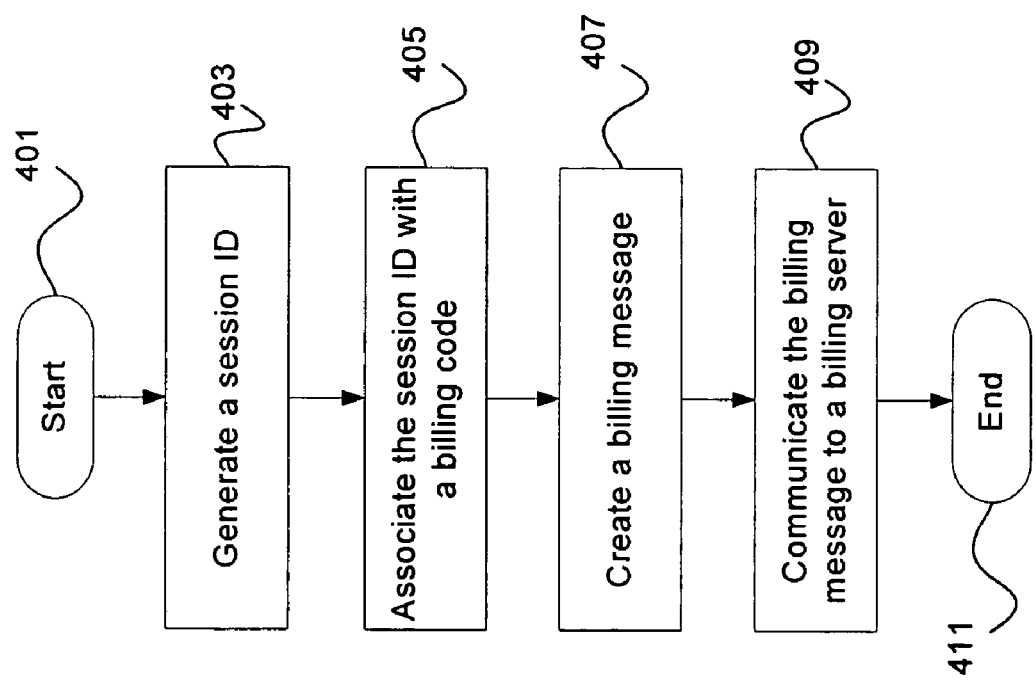
FIG. 4 illustrates a flow diagram of an exemplary billing process in a network, in accordance with an embodiment of the present invention.

FIG. 4 illustrates a flow diagram of an exemplary billing process in a network, in accordance with an embodiment of the present invention. The network may be a DM network such as, for example, the DM network 100 of FIG. 1. The process may begin at a start block 401, where a device management activity may begin and an interaction between a device in the network and a server may commence. The device may be an electronic device such as, for example, the device 107 of FIG. 1, and the sever may be a DM server such as, for example, the DM server 109 of FIG. 1. At a next block 403, a session ID may be generated, wherein the session ID may be associated with the interaction between the device and the server. At a next block 405, the session ID may be associated with a billing code, which may be provided by another server such as, for example, the billing server 111, the service plan management server 121, or the subscriber management server 127 of FIG. 1. Upon termination of a session (i.e., interaction), a billing message containing, for example, information about the subscriber, service details, and the billing code, may be created at a next block 407. The billing message may be communicated to a billing server at a next block 409. The process may end at an end block 411.

Aspects of the present invention may be seen in a device management server that manages at least one device in a network. The device management server may comprise a repository containing a plurality of records, wherein the records comprise information utilized in charging and tracking activities associated with the at least one device, and an assembler that assembles the plurality of records. In an embodiment of the present invention, the device management server may facilitate retrieval of at least one of the plurality of records by an external system.

In an embodiment of the present invention, the external system may employ a web services interface to retrieve at least one of the plurality of records.

In an embodiment of the present invention, the device management server may communicate the at least one of the plurality of records to the external system and the communication occurs via a web service interface. In an embodiment of the present invention, a second external system may provide a reference to the external system and a job identification in response to a management request communicated by the device management server. An identification of the external system may be determined based on the reference and job identification provided by the second external system.

In an embodiment of the present invention, a second external system communicates to the device management server a management request comprising a management operation; at least one parameter associated with the management operation; and a reference to the external system; a job identification. The device management server may communicate a record to the external system employing the reference and the job identification at the termination of the management operation on the at least one device.

In an embodiment of the present invention, the assembler may utilize information about the at least one device and details regarding events associated with the at least one device to assemble each of the plurality of records. The details may comprise information related to a management operation associated with the at least one device. The management operation may comprise at least one of a provisioning event, a firmware update event, a software update event, a diagnostic event, a software purchase event, an installation event, a download event, and a software deletion event.

In an embodiment of the present invention, the at least one device may comprise at least one of a mobile handset, a cellular telephone, a pager, a personal computer, and a personal digital assistant (PDA).

Another aspect of the present invention may be seen in a network that facilitates billing for device management activities associated with devices in the network. The network may comprise at least one electronic device; at least one server that may manage a plurality of device management activities in the at least one electronic device; and a billing server. In an embodiment of the present invention, the at least one server, upon termination of the plurality of device management activities in the at least one electronic device, may employ the billing server to create billing records associated with the at least one electronic device.

In an embodiment of the present invention, the plurality of device management activities may comprise at least one of a provisioning event, a firmware update event, a software update event, a diagnostic event, a software purchase event, an installation event, a download event, and a software deletion event.

In an embodiment of the present invention, the at least one server may employ identifications associated with the plurality of device management activities to communicate information to the at least one electronic device and retrieve the results of the plurality of activities. The at least one server may employ billing codes associated with the identifications to create billing messages and communicate them to the billing server. In an embodiment of the present invention, a billing message may comprise a billing code and information related to an associated device management activity and an associated electronic device.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A device management server that manages at least one device in a network, the device management server comprising:
   a repository containing a plurality of records, wherein the records comprise information utilized in charging and tracking activities associated with the at least one device including at least one billing code associated with each activity by the device management server;
   an assembler that assembles the plurality of records; and
   wherein the device management server facilitates retrieval of at least one of the plurality of records by an external system.

2. The device management server according to claim 1 wherein the external system employs a web services interface to retrieve at least one of the plurality of records.

3. The device management server according to claim 1 wherein the device management server communicates the at least one of the plurality of records to the external system.

4. The device management server according to claim 3 wherein the communication occurs via a web service interface.

5. The device management server according to claim 3 wherein a second external system provides a reference to the external system and a job identification in response to a management request communicated by the device management server.

6. The device management server according to claim 5 wherein an identification of the external system is determined based on the reference and job identification Provided by the second external system.

7. The device management server according to claim 3 wherein a second external system communicates to the device management server a management request comprising:
   a management operation;
   at least one parameter associated with the management operation;
   a reference to the external system;
   a job identification; and
   wherein the device management server communicates a record to the external system employing the reference and the job identification at the termination of the management operation on the at least one device.

8. The device management server according to claim 1 wherein the assembler utilizes information about the at least one device and details regarding events associated with the at least one device to assemble each of the plurality of records.

9. The device management server according to claim 8 wherein the details comprise information related to a management operation associated with the at least one device.

10. The device management server according to claim 9 wherein the management operation comprises at least one of a provisioning event, a firmware update event, a software update event, a diagnostic event, a software purchase event, an installation event, a download event, and a software deletion event.

11. The device management server according to claim 1 wherein the at least one device comprises at least one of a mobile handset, a cellular telephone, a pager, a personal computer, and a personal digital assistant (PDA).

12. A network that facilitates billing for device management activities associated with devices in the network, the network comprising:
   at least one electronic device;
   at least one server that manages a plurality of device management activities in the at least one electronic device; and
   a billing server, wherein the at least one server, upon termination of the plurality of device management activities in the at least one electronic device, employs the billing server to create billing records associated with the at least one electronic device, each billing record including at least one billing code associated with the plurality of device management activities by the at least one server.

13. The network according to claim 12 wherein the plurality of device management activities comprise at least one of a provisioning event, a firmware update event, a software update event, a diagnostic event, a software purchase event, an installation event, a download event, and a software deletion event.

14. The network according to claim 12 wherein the at least one electronic device comprises at least one of a mobile handset, a cellular telephone, a pager, a personal computer, and a personal digital assistant (PDA).

15. The network according to claim 12 wherein the at least one server employs identifications associated with the plurality of device management activities to communicate information to the at least one electronic device and retrieve the results of the plurality of activities.

16. The network according to claim 15 wherein the at least one server employs billing codes associated with the identifications to create billing messages and communicate them to the billing server.

17. The network according to claim 16 wherein a billing message comprises a billing code and information related to an associated device management activity and an associated electronic device.

18. A method for billing for device management activities associated with devices in a network, the method comprising:
    initiating an interaction between a device in a network and a first server;
    generating a session ID associated with the interaction between the device and the first server;
    associating a billing code provided by a second server to the session ID;
    creating a billing message including the billing code; and
    communicating the billing message to a third server.

19. The method of claim 18, wherein initiating the interaction comprises initiating at least one of a firmware update event, a software update event, a diagnostic event, a software purchase event, an installation event, a download event, and a software deletion event.

20. The method of claim 18, wherein associating the billing code comprises associating a billing code including a combination of other codes to the session ID.

* * * * *